J. G. PERRY.
Meat Cutter.
No. 37,053.
Patented Dec. 2, 1862.
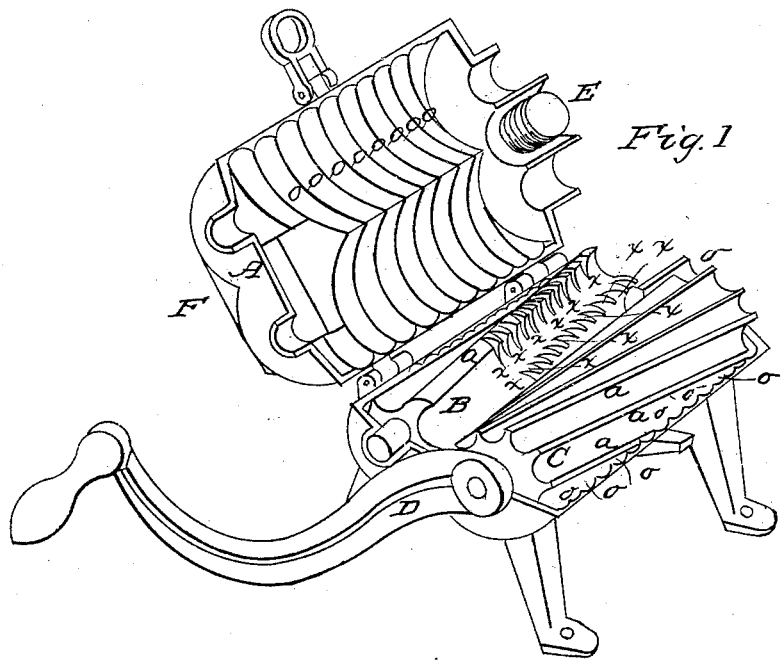
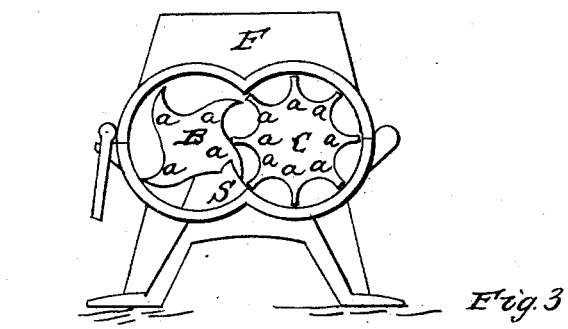
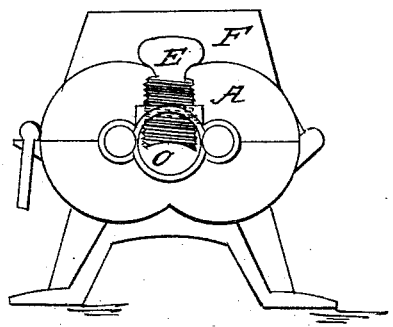
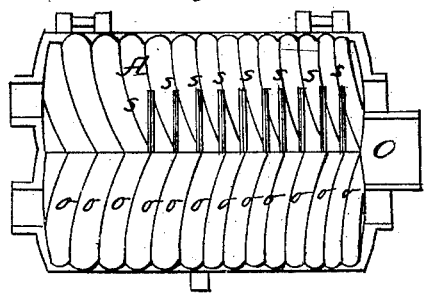
Witnesses
O. H. Perry
John E. Perry
Inventor
John G. Perry

UNITED STATES PATENT OFFICE.

JOHN G. PERRY, OF SOUTH KINGSTON, RHODE ISLAND.

IMPROVED MEAT-CUTTER.

Specification forming part of Letters Patent No. 37,053, dated December 2, 1862.

*To all whom it may concern:*

Be it known that I, JOHN G. PERRY, of South Kingston, in the county of Washington, in the State of Rhode Island, have invented a new and Improved Machine for Cutting Meat, &c., for Sausages and other Purposes; and I do hereby declare that the following is a full and correct description thereof, reference being had to the accompanying drawings, and to the letters of reference marked thereon, the same letters being used to denote similar parts in all the figures.

Figure 1 is a perspective view of the cutter open. Fig. 2 is a vertical cross-section of the cylinders and case. Fig. 3 shows the arrangement of the knives in the bottom part of the case. Fig. 4 is a back elevation of the machine, showing the screw-gate in the discharge-aperture.

To construct this machine, make a case, in shape like two hollow cylinders placed side by side, and divided horizontally through their centers into an upper and lower part, which are hinged together on one side and fastened with a catch on the other. In this case are placed two cylinders, B C, having longitudinal spiral flanges $a$ on them, just large enough to turn inside the case. These flanges form cutters, as the cylinders are placed close enough together to oblige the flanges of one to pass in between those of the other. One cylinder should have a less number of flanges than the other, but more spiraling, the amount of spiral being in the inverse proportion to the number of flanges, and should be in opposite directions on the two cylinders. The difference in number of flanges and the increased spiral obliges one cylinder to turn faster than the other. This, as the flanges cut by each other, gives a shearing drawing cut, which divides the meat in an easier and more effective manner than they otherwise would. The flanges of the cylinder having the smaller number have a series of grooves, $x\ x$, cut through them, to admit the knives $s\ s\ s$, that project up from the bottom of the case, to enter, so as to cut the meat that is between the flanges across in a direction nearly square to that in which the flanges cut it. The inside of the case is grooved with spiral grooves $o$, those in the lower part running from the center to the sides and at the same time toward the discharge end of the case. Those in the upper part run from the sides to the center and toward the discharge end. These help to move the meat along in that direction as fast as it is cut.

E is a gate to regulate the discharge of the meat, the retarding of which retains the meat longer in the cutter and causes it to be cut finer. This gate E has a screw-thread cut on it, which fits in one made in the top of the discharge-aperture, so that it can be set up or down by turning, so as to close the aperture more or less. The two cylinders may be geared together, if preferred, in which case the gear-wheels should be in the same proportion to each other as the number of flanges on the two cylinders B C. One of the cylinders has a crank, D, on its axle, to turn it by, and the other is driven by the flanges $a$, acting as the teeth of gear-wheels. A hopper, F, is placed near one end of the case on the top.

The operation of the machine is as follows: The crank D being turned, so as to drive the cylinders down in the center, the pieces of meat are fed into the hopper F, and being caught between the flanges of the two cylinders are drawn in and cut into small strips in the direction of the flanges, one set of which going faster than the other gives, as before stated, a shearing drawing cut in dividing the meat, which is then worked along by the joint action of the flanges $a$ and the grooves $o$ in the case until it comes to the knives $s\ s$, which cut it across in the other direction. Thus, by the operation of the flanges cutting together, the cross-knives and the flanges cutting across the grooves in the case, the meat is minced very rapidly, and finally discharged at O, which may be provided with a proper nozzle to hold the skins or cases, so that it may fill the sausages at the same operation.

Having thus described my meat-cutter, I claim—

1. The combination of the two spiral-flanged cylinders differing from each other in the number of flanges and in the speed at which they are driven, substantially as herein described, and for the purposes set forth.

2. The cross-knives $s$, in combination with the case and cylinders, substantially as described, and for the purpose set forth.

JOHN G. PERRY.

In presence of—
  O. H. PERRY,
  JOHN E. PERRY.